Jan. 23, 1968   A. E. KELLEY   3,365,391
INTEGRAL HYDROFINING-HYDROCRACKING PROCESS
Filed March 8, 1965   2 Sheets-Sheet 1
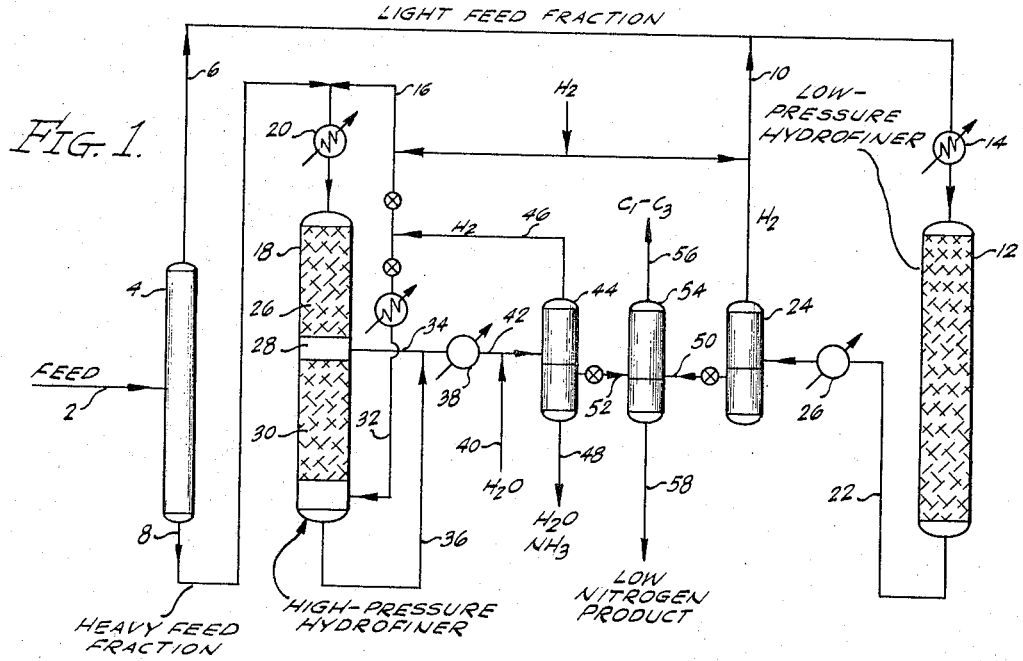
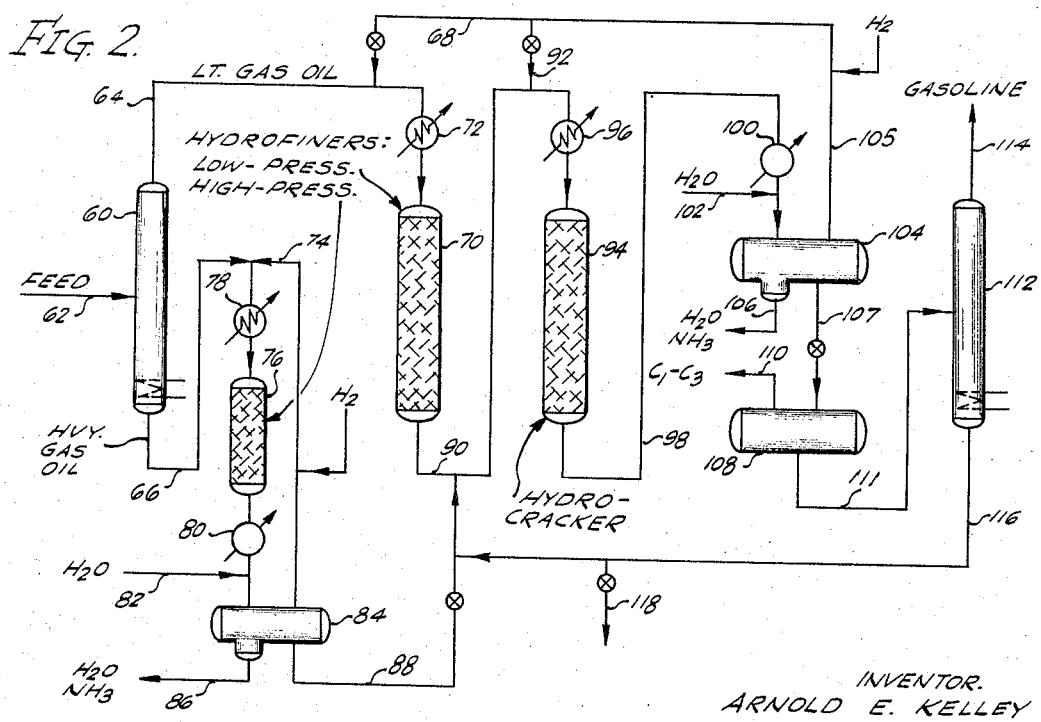
INVENTOR.
ARNOLD E. KELLEY
BY
James S. Henderson
ATTORNEY

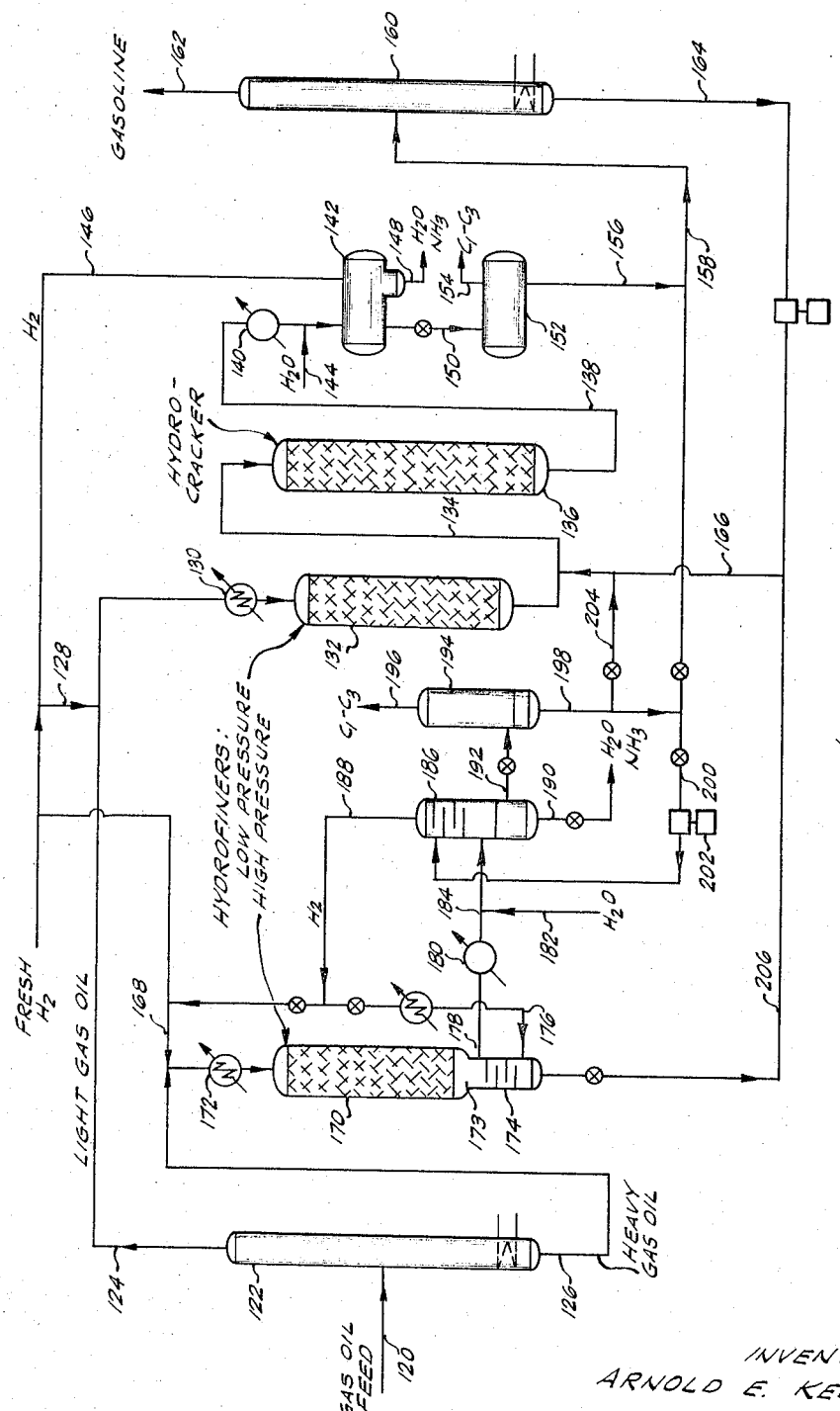

United States Patent Office 3,365,391
Patented Jan. 23, 1968

3,365,391
INTEGRAL HYDROFINING-HYDRO-CRACKING PROCESS
Arnold E. Kelley, Orange, Calif., assignor to Union Oil Company of California, Los Angeles, Calif., a corporation of California
Filed Mar. 8, 1965, Ser. No. 437,798
13 Claims. (Cl. 208—89)

This invention relates to the catalytic hydrofining of heavy gas oils to effect substantially complete denitrogenation thereof, and to an advantageous combination of the novel hydrofining process with a succeeding "integral" catalytic hydrocracking step. In broad aspect, the novel hydrofining process involves a split-feed operation, wherein the initial feedstock is fractionated to recover a heavy gas oil containing the more refractory organic nitrogen compounds, and a light gas oil containing relatively less refractory nitrogen compounds. The heavy gas oil fraction is then subjected to catalytic hydrofining at relatively high hydrogen partial pressures, and the light gas oil is hydrofined at relatively lower hydrogen partial pressures. By operating in this manner, it is found that over-all greater economy is achieved than can be obtained by hydrofining the full-range feedstock at either the relatively high pressures or the relatively lower pressures, utilized in this split-feed treatment.

The split-feed hydrofining process is particularly adapted for use in combination with a succeeding "integral" hydrocracking operation, wherein total effluent from at least the low-pressure hydrofiner, including ammonia formed therein and the excess hydrogen, is passed directly through a catalytic hydrocracker operated at substantially the same pressure, to obtain a substantial conversion of the feed to gasoline or other low-boiling hydrocarbons.

In one modification of the invention, total effluent from the high-pressure hydrofiner may be depressured without cooling, directly into the transfer line from the low-pressure hydrofiner to the hydrocracker. Such an operation is normally feasible where only a minor proportion of the total feed is treated in the high-pressure hydrofiner; under these circumstances the high-pressure unit can be operated with once-through hydrogen flow (no recycle), the excess hydrogen then serving as make-up for the low-pressure hydrofiner-hydrocracker train. However, in cases where a relatively large proportion of the total feed is treated in the high-pressure hydrofiner, the resulting large excess of hydrogen cannot be utilized in the low-pressure units, and the power requirements involved in pressuring up large volumes of once-through hydrogen and/or low-pressure recycle gas recovered from the hydrocracker effluent, for the high-pressure hydrofiner, become prohibitively expensive. Two alternative methods are herein described for avoiding this difficulty, both of which involve maintaining a separate recycle gas system for the high-pressure hydrofiner.

In one alternative (FIGURE 2), the entire effluent from the high-pressure hydrofiner is cooled, condensed and washed with water (but is not depressured), high-pressure recycle gas is recovered from the separator, and the remaining liquid hydrocarbons are partially depressured into the transfer line between the low-pressure hydrofiner and the hydrocracker. This modification provides an almost completely ammonia-free heavy feed charge to the hydrocracker, an ammonia-free high-pressure recycle gas, and also provides for effective purging of the high-pressure recycle gas of light $C_1$–$C_3$ hydrocarbon gases, since it is equilibrated against the total, cool, high-pressure condensate from the high-pressure hydrofiner. The disadvantage of this mode of operation is that it is necessary to reheat the entire heavy feed charge to the hydrocracker.

This latter disadvantage is avoided in another modification of the invention (FIGURE 3) wherein the total high-pressure hydrofiner effluent is separated hot, and the major, heavy liquid portion of effluent is transferred directly to the hydrocracker. The vapor phase effluent from the high-pressure hydrofiner is then cooled, condensed and preferably water-washed to recover ammonia-free, high-pressure recycle gas and a small proportion of heavy feed condensate. The latter may be transferred directly to the hydrocracker, or it may be depressured to flash off light gases, and a portion of the flashed condensate may then be repressured and recycled to the high-pressure separator to scrub additional $C_1$–$C_3$ gases from the high-pressure recycle gas. This scrubbing step, or some equivalent procedure, is generally required in this modification in order to prevent the build-up of light hydrocarbons in the high-pressure recycle gas, since otherwise this recycle gas would be equilibrated in the separator against only a minor proportion of liquid condensate, insufficient to reduce light hydrocarbons to the desired equilibrium levels.

In a preferred aspect of the invention, at least a portion of the high-pressure hydrofining operation is carried out with countercurrent flow of hydrogen and liquid feedstock. By operating in this manner, the concentration of ammonia in the lower portion of the hydrofining catalyst bed is minimized, thereby increasing the efficiency of catalyst utilization in the lower portion of the reactor.

Catalytic hydrofining has long been employed for the desulfurization and denitrogenation of hydrocarbon oils. It is generally recognized in the art that the hydrodenitrogenation reaction proceeds considerably slower than the desulfurization reaction, and accordingly, complete desulfurization can be obtained under relatively mild conditions, whereas denitrogenation requires more severe conditions. Adequate denitrogenation to produce low-nitrogen products for reforming, or for hydrocracking, has in the past required very low space velocities, resulting in large catalyst inventories and large reactors being required for a given feed throughput. The expense involved in obtaining adequate denitrogenation is particularly acute where high end-point feedstocks containing components boiling above about 750° F. are utilized. The present invention is directed principally to the problem of reducing the expense involved in denitrogenating and hydrocracking nitrogen-rich, high-end-point mineral oil fractions. The following basic discoveries are the principal factors leading to the novel denitrogenation process herein described:

Firstly, it has been discovered that the heavy ends of mineral oil fractions boiling above about 750° F. are relatively more concentrated in nitrogen compounds than the lighter fractions, and that these heavy nitrogen compounds exert a specific deactivating effect upon the catalyst which reduces their activity for converting the lower-boiling nitrogen compounds. Accordingly, by removing the heavy ends of the feedstock, the remaining lighter fraction may be more efficiently denitrogenated in the absence of the heavy portion, and at lower pressures.

Secondly, it has been found that the ammonia formed during denitrogenation itself exerts a deactivating effect upon the catalyst which inhibits its activity for decomposing organic nitrogen compounds of the feed. Hence, in the preferred modification of the process involving countercurrent flow of hydrogen with the heavy feed fraction, the lower portion of the catalyst bed is maintained substantially free of amonia thereby improving denitrogenation efficiency and permitting essentially complete decomposition of heavy organic nitrogen compounds.

Thirdly, it has been found that, of all the denitrogenation process variables, temperature, pressure, space velocity, and hydrogen/oil ratios, the reaction is most sensitive to hydrogen partial pressure, especially with respect to the heavy ends of the feedstock. In respect to the heavy feed portions it has been found that increased temperatures, above about 750° F., effect little if any improvement in denitrogenation rates. Liquid hourly space velocities can of course be reduced to very low values, in the order of about 0.01 to 0.2, to complete the denitrogenation, but this leads to prohibitive expense both in respect to catalyst volumes and reactor size. However, by elevating the hydrogen partial pressure from the usual levels in the neighborhood of about 500–1,500 p.s.i.a. to values in the range of about 2,000–4,000 p.s.i.a., the desired denitrogenation can be obtained at moderate temperatures of e.g. 650 to 800° F. while operating at economical space velocities in the range of about 0.5–5.0. While high-presure reactors for this mode of operation are more expensive, it has been found that the alternative low-space-velocity route is considerably more expensive.

U.S Patent No. 3,159,568 discloses an advantageous combination of hydrofining followed by hydrocracking, wherein the entire effluent from the hydrofiner may be transferred directly to the hydrocracker without intervening cooling, depressuring, reheating, or other treatment for removal of volatile decomposition products from the hydrofining step. This "integral" hydrofining-hydrocracking operation achieves important economies by eliminating the conventional interstage treatments between the two contacting zones. No serious difficulties are encountered in the application of this technique where the initial feedstock is free of components boiling above about 750° F. However, in the case of higher boiling feedstocks, the difficulties referred to above are encountered, i.e. the difficulty in obtaining adequate denitrogenation of the heavy ends of the feedstock. This problem becomes particularly acute when the hydrofined product is to be subjected to hydrocracking, for undecomposed heavy organic nitrogen compounds exert a disproportionately strong deactivating effect upon hydrocracking catalysts. The split-feed hydrofining process of this invention offers a highly desirable solution to this problem.

For a more detailed description of the invention, reference is made to the accompanying drawings, wherein:

FIGURE 1 is a flow sheet illustrating one adaptation of the basic split-feed hydrofining operation;

FIGURE 2 is a flow sheet illustrating a combination of the hydrofining operation with a succeeding hydrocracking step involving total condensation of the high-pressure hydrofiner effluent;

FIGURE 3 is a modification of the FIGURE 2 process, involving only partial condensation of the high-pressure hydrofiner effluent.

Referring more particularly to FIGURE 1, the initial feedstock is brought in through line 2 and fractionated in column 4 to recover overhead via line 6 a relatively light feed fraction, and a relatively heavy bottoms fraction via line 8. The end-boiling-point of the light feed fraction in line 6 is preferably between about 700° and 800° F., which also brackets the initial boiling point of the heavy bottoms fraction.

The light feed in line 6 is mixed with recycle and make-up hydrogen from line 10 and transferred to low-pressure hydrofiner 12 via preheater 14. The heavy feed fraction in line 8 is mixed with high-pressure recycle and make-up hydrogen from line 16 and passed into the top of high-pressure hydrofiner 18 via preheater 20.

In low-pressure hydrofiner 12, the feed plus hydrogen contacts the catalyst in conventional concurrent downflow, and is withdrawn from the reactor via line 22 and passed into pressure separator 24 after being cooled to e.g. 100° to 200° F. in condenser 26.

In high-pressure hydrofiner 18, the feed plus hydrogen passes concurrently downwardly through upper catalyst bed 26, and thence into interspace 28 where it mingles with hydrogen and vaporized hydrocarbons passing upwardly from lower catalyst bed 30. In catalyst bed 30, excess liquid feed from upper catalyst bed 26 passes downwardly, countercurrently to upwardly flowing preheated hydrogen admitted via line 32. The combined vapor phase effluent from catalyst beds 26 and 30 is removed from reactor 18 via line 34, and is mixed therein with liquid phase effluent taken off from the bottom of the reactor via line 36. The total mixed hydrofiner effluent in line 34 then passes through condenser 38, and the condensate is mixed with wash water from line 40. The resulting mixture in line 42 is then transferred to pressure separator 44, from which high-pressure, ammonia-free recycle gas is withdrawn via line 46 and recycled as previously described. Spent wash water containing dissolved ammonia and some hydrogen sulfide is withdrawn from the bottom of pressure separator 44 via line 48.

The respective liquid hydrocarbon condensates in separators 24 and 44 are then flashed via lines 50 and 52 respectively, into low-pressure separator 54, from which light flash gases comprising mainly methane, ethane and propane, is exhausted via line 56. The combined liquid product from both hydrofiners is withdrawn via line 58.

Referring now to FIGURE 2, the initial feedstock is brought into fractionator 60 via line 62 and fractionated as previously described, the light gas oil being taken overhead via line 64, and the heavy gas oil being removed as bottoms via line 66. The light feed in line 64 is blended with recycle and make-up hydrogen from line 68 and passed into low-pressure hydrofiner 70 via preheater 72. The heavy gas oil in line 66 is blended with recycle and make-up hydrogen from line 74 and passed into high-pressure hydrofiner 76 via preheater 78.

Effluent from high-pressure hydrofiner 76 is withdrawn and passed through condenser 80, mixed with wash water injected via line 82, and transferred to pressure separator 84, from which spent wash water is removed via line 86. High-pressure, ammonia-free recycle gas is withdrawn via line 74, while the condensed liquid hydrocarbon product is partially depressured via line 88 into the effluent line 90 from low-pressure hydrofiner 70.

The combined hydrofiner effluents in line 90 are then mixed with additional hydrogen from line 92, and transferred to hydrocracker 94 via preheater 96. In hydrocracker 94, hydrocracking proceeds using catalysts and conditions described hereinafter, and the effluent therefrom is removed via line 98, cooled in condenser 100, mixed with wash water from line 102, and transferred to pressure separator 104, from which spent wash water is withdrawn via line 106. The hydrocarbon condensate in separator 104 is flashed via line 106 into low-pressure separator 108, from which light hydrocarbon gases are exhausted via line 110. Low-pressure condensate in separator 108 is then transferred via line 110 to fractionator 112, from which gasoline product is withdrawn overhead via line 114, and unconverted oil is withdrawn as bottoms via line 116 and recycled to hydrocracker 94 via lines 88 and 90. If desired, a portion of this recycle oil may be withdrawn via line 118 for use as jet fuel and/or diesel fuel.

Referring now to FIGURE 3, the initial gas oil feedstock is brought in via line 120 and fractionated in fractionator 122 to recover overhead the light gas oil fraction via line 124, and the heavy gas oil feed in line 126. The light gas oil fraction is mixed with recycle and fresh hydrogen from line 128, and passed as previously described through preheater 130, low-pressure hydrofiner 132, transfer line 134, hydrocracker 136, transfer line 138, condenser 140, and into pressure separator 142 after being mixed with wash water injected via line 144. Low-pressure, substantially ammonia-free recycle gas is withdrawn from separator 142 via line 146 and recycled to low-pressure hydrofiner 132, and spent wash water is withdrawn via line 148. Washed liquid condensate in separator 142 is then flashed via line 150 into low-pressure separator 152, from which light flash gases are exhausted via line 154. Low-pressure condensate in separator 152 is transferred via lines 156 and 158 to fractionating column 160, from which gasoline product is withdrawn overhead via line 162, and unconverted oil is recycled to hydrocracker 136 via lines 164, 166 and 134.

The heavy gas oil feed line 126 is mixed with recycle and fresh hydrogen from line 168, and passed into high-pressure hydrofiner 170 via preheater 172. After passing downwardly through the catalyst bed in hydrofiner 170, the mixed phase effluent passes into a vapor-disengaging zone 172, and the liquid phase product, still substantially at reactor temperatures, percolates downwardly through a high-pressure stripping section 174, countercurrently to a stream of preheated recycle gas injected via line 176. The recycle gas injected via line 176 strips out dissolved ammonia, light hydrocarbon gases and the like, and the stripping vapors mingle with the hydrofiner effluent in vapor-disengaging zone 172. This combined vapor phase mixture is then withdrawn from the reactor via line 178 cooled to e.g. 100° to 200° F. in condenser 180, and mixed with wash water injected from line 182.

The resulting mixture of condensed hydrofiner effluent, hydrogen, and wash water in line 184 is then transferred to high-pressure separator-absorber 186, from which high-pressure recycle hydrogen is withdrawn and recycled via line 188, and spent wash water is withdrawn via line 190. The high-pressure condensate in separator 186 is flashed via line 192 into low-pressure separator 194, from which light flash gases are exhausted via line 196.

The low-pressure condensate in separator 194 is withdrawn via line 198, and a portion thereof is repressured via line 200 and pump 202, into the top of separator-absorber 186 where it passes downwardly, countercurrently to the recycle hydrogen being taken overhead. This absorption serves to remove additional light hydrocarbon gases from the high-pressure recycle gas, thereby preventing their build-up in high-pressure hydrofiner 170. A hydrogen enrichment procedure such as this is normally required in this modification, since the major portion of the hydrocarbon effluent from hydrofiner 170 is withdrawn as a hot liquid phase, and therefore contains very little dissolved light hydrocarbons. The minor proportion of cool hydrofiner effluent which comes out as condensate in separator 186 is normaly insufficient to keep the equilibrium partial pressure of light hydrocarbon gases in the hydrofiner down to desired low levels of e.g. 1–10% of the total pressure.

The remainder of the low-pressure condensate in line 198 may be transferred directly to hydrocracker 136 via lines 204, 166 and 134, but preferably is diverted via line 158 to fractionating column 160, in order to recover the minor proportion of gasoline synthesized in high-pressure hydrofiner 170. This improves the selectivity of hydrocracking in hydrocracker 136, and also increases the capacity of the unit by reducing the proportion of gasoline-boiling-range hydrocarbons in the feed thereto. The small proportion of hydrocarbons boiling above the gasoline range in the low-pressure condensate from separator 194 is recovered as bottoms along with the recycle oil from column 160 in line 164, all of which goes back to hydrocracker 136 via lines 166 and 134.

The stripped, heavy liquid product which accumulates in the bottom of stripping section 174 of high-pressure hydrofiner 170 is partially depressured via lines 206 and 166 into transfer line 134 between low-pressure hydrofiner 132 and hydrocracker 136. It will be apparent that by operating in this manner the major desired advantage is attained of avoiding the expensive cooling and reheating of the major part of the effluent from the high-pressure hydrofiner, as was necessary in the modification shown in FIGURE 2.

Feedstocks which may be employed herein include in general any nitrogen-containing mineral oil fraction boiling over a substantial range of at least about 100° F., preferably at least 300° F. For purposes of gasoline production by hydrocracking, the primary feedstocks comprise straight-run gas oils, coker distillate gas oils, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to use feedstocks boiling between about 400° and 1,000° F., containing at least about 10% by volume of material boiling above 700° F., at least about 20% of material boiling below 700° F., and at least about 0.02% by weight of total nitrogen.

The initial fractionation of these feedstocks to produce the light and heavy feed fractions to the respective hydrofiners is controlled so as to produce a light gas oil boiling predominantly below 700° F., and a heavy gas oil boiling predominantly above 700° F. Preferably, at least about 80% of the heavy gas oil boils above 700° F. and at least about 95%, and still more preferably, at least about 99%, of the light gas oil boils below 750° F. However, substantially improved results are obtained in all cases where a relatively high-boiling feed fraction is used in the high-pressure hydrofiner, and a relatively lower-boiling fraction in the low-pressure hydrofiner.

The hydrofining catalysts which may be employed in the hydrofining units described may comprise any of the oxides and/or sulfides of the transitional metals, and especially an oxide or sulfide of a Group VIII metal (particularly cobalt or nickel) mixed with an oxide or sulfide of a Group VI B metal (preferably molybdenum or tungsten). Such catalysts preferably are supported on an adsorbent carrier in proportions ranging between about 2% and 25% by weight. Suitable carriers include in general the difficultly reducible inorganic oxides, e.g., alumina, silica, zirconia, titania, clays such as bauxite, bentonite, etc. Preferably the carrier should display little or no cracking activity, and hence highly acidic carriers having a Cat-A cracking activity index above about 20 are to be avoided. The preferred carrier is activated alumina, and especially activated alumina containing about 3–15% by weight of coprecipitated silica gel.

The preferred hydrofining catalyst consists of nickel sulfide or oxide plus molybdenum sulfide or oxide supported on silica-stabilized alumina. Compositions containing between about 1% and 5% of Ni, 3% and 20% of Mo, 3% and 15% of $SiO_2$, and the balance $Al_2O_3$, and wherein the atomic ratio of Ni/Mo is between about 0.2 and 4, are specifically contemplated.

Suitable process conditions for the respective hydrofining operations described fall within the following general ranges:

HYDROFINING CONDITIONS

| | Broad Range | Preferred Range |
|---|---|---|
| Av. Bed Temp., ° F | 600–850 | 650–800 |
| LHSV | 0.3–20 | 0.5–5 |
| $H_2$/Oil Ratio, M s.c.f./b | 0.5–20 | 4–12 |
| Partial Pressure of $H_2$, p.s.i.a.: | | |
|   For Low-Pressure Hydrofiner | 400–2,500 | 700–2,000 |
|   For High-Pressure Hydrofiner | 1,000–5,000 | 1,500–4,000 |

Where the hydrofiner effluent is to be hydrocracked, it is preferred that the above hydrofining conditions be suitably correlated so as to reduce the organic nitrogen content of the respective products to below about 100, and preferably below about 25 parts per million. It is also preferred, however, to avoid hydrofining conditions so severe as to convert more than about 10–15 volume-percent of gas oil feeds to gasoline. In general, the high-pressure hydrofiner is operated at a hydrogen partial pressure at least about 400 p.s.i. higher than the low-pressure hydrofiner.

The hydrocracking catalysts employed herein may consist of any desired combination of a refractory cracking base with a suitable hydrogenating component. Suitable cracking bases are those having a Cat-A Activity Index above about 20, and preferably above 30, including for example mixtures of two or more difficultly reducible oxides such as silica-alumina, silica-magnesia, silica-zirconia, alumina-boria, silica-titania, silica-zirconia-titania, acid-treated clays and the like. Acidic metal phosphates such as aluminum phosphate may also be used. The preferred cracking bases comprise partially dehydrated, zeolitic, crystalline molecular sieves having relatively uniform pore diameters of about 6–14 A, and comprising silica, alumina and one or more exchangeable zeolitic cations. These crystalline zeolites may be used as the sole cracking base, or they may be mixed with one or more of the amorphous cracking bases such as silica-alumina cogel.

A particularly active and useful class of molecular sieve cracking bases are those having a relatively high $SiO_2/Al_2O_3$ mole-ratio, e.g., between about 3 and 10. Suitable zeolites found in nature include for example mordenite, stilbite, heulandite, ferrierite, dachiardite, chabazite, erionite, and faujasite. Suitable synthetic molecular sieve zeolites include for example those of the B, X, Y, and L crystal types, or synthetic forms of the natural zeolites noted above, especially synthetic mordenite. For maximum activity in converting gas oils to gasoline, the preferred zeolites are those having crystal pore diameters between about 8–12 A, wherein the $SiO_2/Al_2O_3$ mole-ratio is about 3–6. A prime example of a zeolite falling in this preferred group is the synthetic Y molecular sieve.

The naturally occurring molecular sieve zeolites are normally found in a sodium form, an alkaline earth metal form, or mixed forms. The synthetic molecular sieves normally are prepared in the sodium form. In any case, for use as a cracking base it is preferred that most or all of the original zeolitic monovalent metals be ion-exchanged out with a polyvalent metal, or with an ammonium salt followed by heating to decompose the zeolitic ammonium ions, leaving in their place hydrogen ions and/or exchange sites which have actually been decationized by further removal of water:

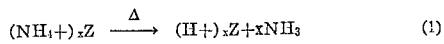

$$(NH_4+)_xZ \xrightarrow{\Delta} (H+)_xZ + xNH_3 \quad (1)$$

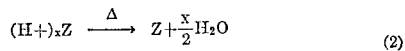

$$(H+)_xZ \xrightarrow{\Delta} Z + \frac{x}{2}H_2O \quad (2)$$

In some cases, as in the case of synthetic mordenite, the hydrogen forms can be prepared by direct acid treatment of the alkali metal sieves. Hydrogen or "decationized" Y sieve zeolites are more particularly described in U.S. Patent No. 3,130,006.

Mixed polyvalent metal-hydrogen zeolites may be prepared by ion exchanging first with an ammonium salt, then partially back exchanging with a polyvalent metal salt, and then calcining. Suitable polyvalent metal cations include magnesium, calcium, zinc, the rare earth metals, chromium, nickel and the like, or in general any of the polyvalent metals of Group I–B through Group VIII. The preferred polyvalent metals are the alkaline earths, zinc, and the rare earths.

There is some uncertainty as to whether the heating of the ammonium zeolites produces a hydrogen zeolite or a truly decationized zeolite, but it is clear that, (a) hydrogen zeolites are formed upon initial thermal decomposition of the ammonium zeolite, and (b) if true decationization does occur upon further heating of the hydrogen zeolites, the decationized zeolites also possess desirable catalytic activity. Both of these forms, and the mixed forms, are designated herein as being "metalcation-deficient."

The foregoing cracking bases are compounded, as by impregnation, with from about 0.5% to 25% (based on free metal) of a Group VI–B and/or Group VIII hydrogenating metal promoter, e.g., an oxide or sulfide of chromium, tungsten, cobalt, nickel, or the corresponding free metals, or any combination thereof. Alternatively, even smaller proportions, between about 0.05% and 2% of the metals platinum, palladium, rhodium or iridium may be employed. The oxides and sulfides of other transitional metals may also be used but to less advantage than the foregoing.

In the case of zeolitic type cracking bases, it is desirable to deposit the hydrogenating metal thereon by ion exchange. This can be accomplished by digesting the zeolite with an aqueous solution of a suitable compound of the desired metal, wherein the metal is present in a cationic form, and then reducing to form the free metal, as described for example in Belgian Patent No. 598,686.

Although as indicated above, substantially any hydrocracking catalyst may be used herein, it is not to be assumed that all such catalysts are equivalent, or that they will all give a commercially feasible process. For hydrocracking at below about 850° F. in the presence of ammonia, it is highly desirable to use catalysts which have both a high cracking activity and high hydrogenating activity; otherwise it will be necessary to employ uneconomical low space velocities. For economical hydrocracking units operated at above about 0.5 LHSV, the preferred catalysts are composed of a Group VIII noble metal, e.g., platinum, palladium, rhodium, iridium or ruthenium, combined by ion exchange with one of the zeolitic molecular sieve cracking bases of the Y crystal type, wherein the zeolitic cations are predominantly hydrogen and/or a polyvalent metal such as calcium, magnesium, zinc, or rare earth metals. The more conventional catalysts such as platinum on silica-alumina gel, or nickel on silica-alumina gel, will require low space velocities, in general below about 0.5 in order to achieve the desired conversion at the specified hydrocracking temperatures.

Hydrocracking conditions to be employed in conjunction with the foregoing catalysts fall within the following general ranges:

HYDROCRACKING CONDITIONS

|  | Broad Range | Preferred Range |
| --- | --- | --- |
| Av. Bed Temp., ° F | 600–875 | 700–850 |
| LHSV | 0.5–20 | 1–10 |
| $H_2$/Oil Ratio, M s.c.f./b | 0.5–20 | 4–12 |
| Partial Pressure of $H_2$, p.s.i.a | 400–2,500 | 800–2,000 |

The following examples are cited to illustrate the invention and the results obtainable, but are not to be construed as limiting in scope. In these examples, the specified operating pressures refer to total pressures, and in all cases the hydrogen partial pressure is 85–98% of the total pressure.

*Example I*

This example illustrates process conditions and results obtainable in an extended hydrofining-hydrocracking run carried out as described in FIGURE 3, with the total low-pressure hydrofiner effluent being transferred directly from hydrofiner 132 to hydrocracker 136, and with hot liquid effluent from the high-pressure hydrofiner 170 being transferred directly to the hydrocracker along with the condensate from separator 194. The raw feedstock is a blend of California coker gas oils having an API gravity of about 18.0, a boiling range of about 460° to 860° F. and containing about 2.4 weight-percent sulfur and 0.5 weight-percent nitrogen. In the initial fractionation, this feed is split into 60% by volume of light gas oil boiling up to about 730° F., and 40% by volume of heavy gas oil with a 10% boiling point of 725° F. The nitrogen content of the light gas oil is 0.35 weight-percent, and of the heavy gas oil, 0.7 weight-percent.

The hydrofining catalyst employed in each of the hydrofiners is the sulfided equivalent of 3% nickel oxide and 15% molybdenum oxide supported on an alumina carrier stabilized by the addition of about 5% $SiO_2$, in the form 1/8" pellets. The hydrocracking catalyst is a co-pelleted mixture of about 80 weight-percent of a Y molecular sieve zeolite containing 0.5 weight-percent palladium, and 20 weight-percent of an activated alumina binder containing 0.3 weight-percent palladium. The Y molecular sieve cracking base has a $SiO_2/Al_2O_3$ mole-ratio of about 4.7, about 35% of the zeolitic ion-exchange capacity thereof being satisfied by magnesium ions (3 weight-percent MgO), about 10% by sodium ions, and the remainder by hydrogen ions.

Hydrofining process conditions are adjusted so as to reduce the organic nitrogen content of the light feed fraction to about 2–4 p.p.m. in the low-pressure hydrofiner, and of the heavy feed fraction to about 10–12 p.p.m. in the high-pressure hydrofiner. Hydrocracking conditions are adjusted to provide about 50 volume-percent conversion to 400° F. end-point products per pass. To achieve these objectives the major process conditions and results are as follows:

PROCESS CONDITIONS

|  | Low-Pressure Hydrofiner | High-Pressure Hydrofiner | Hydrocracker |
|---|---|---|---|
| Temp., Av. Bed ° F.: | | | |
| Start of Run | 720 | 730 | 715 |
| End of Run | 780 | 780 | 770 |
| Pressure, p.s.i.g | 1,650 | 2,500 | 1,650 |
| LHSV | 0.9 | 0.6 | 1.75 |
| $H_2$/Oil Ratio, M s.c.f./b | 6.0 | 7.0 | 8.0 |

At start-of-run conditions, product distribution and quality is approximately as follows:

Dry gas make ($C_1$–$C_3$), s.c.f./b. fresh feed _____ 110

Liquid Yields, vol. percent Fresh Feed:
  Butanes _____ 16
  Pentanes _____ 14.4
  $C_6$ _____ 15.0
  $C_7$—400° F. gasoline _____ 80.8

$C_4$—400° F. gasoline _____ 126.2

Gasoline Quality—Octane No., F-1+3 ml. TEL:
  $C_5$—185° F. fraction _____ 98.8
  185—400° F. fraction _____ 84.2

From the foregoing data it will be noted that an average liquid hourly space velocity of 0.78 is effective to reduce the total, mixed hydrofiner effluent nitrogen level to about 6–7 p.p.m. To achieve this same degree of total denitrogenation of the full-range feedstock in a single hydrofiner operated at 1,650 p.s.i.g., other conditions being the same, a liquid hourly space velocity of about 0.5 or less is required, or more than 1.5 times the total amount of hydrofining catalyst and reactor volume.

*Example II*

This example illustrates the detrimental effect of ammonia and the beneficial effects of hydrogen sulfide in the hydrodenitrogenation reaction.

A series of hydrofining runs was carried out at 749° F. average bed temperature, 512 p.s.i.g., and 8.0 LHSV, using a feed blend of straight-run and coker naphthas having a gravity of 43.6 API, and containing 1.34 weight-percent sulfur and 0.04 weight-percent total nitrogen. The ratio of hydrogen (total gas) to feed was maintained constant at about 2252 s.c.f./b. throughout the runs, but the composition of the charge gas was varied by adding thereto various proportions of hydrogen sulfide and ammonia. The catalyst was a presulfided composite of about 15 weight-percent $MoO_3$ and 3.5 weight-percent CoO deposited upon an activated alumina carrier containing about 5 weight-percent of co-precipitated silica. The significant results of the various runs were as follows:

TABLE 1

| Run No | 1 | 2 | 3 | 4 | 5 | 6 |
|---|---|---|---|---|---|---|
| Composition of Gas Charge: | | | | | | |
| Hydrogen, vol. percent | 100 | 98 | 98.5 | 95.0 | 89.1 | 100 |
| $H_2S$, vol. percent | 0 | 1.7 | 1.3 | 4.8 | 10.7 | 0 |
| $NH_3$, p.p.m. of feed | 0 | 0 | 0 | 0 | 0 | 4,850 |
| Liquid Product Analysis: | | | | | | |
| Gravity, ° API | 47.2 | 47.2 | 47.2 | 47.3 | 47.2 | 47.3 |
| Sulfur, wt. percent | 0.006 | 0.015 | 0.015 | 0.035 | 0.031 | 0.011 |
| Basic Nitrogen, p.p.m. | 54 | 59 | 45 | 38 | 42 | 110 |
| Relative Denitrogenation activity (Bulk Volume Basis) | 100 | 95 | 111 | 122 | 117 | 55 |

It is apparent from the above data that the addition of 4850 parts per million of ammonia to the feedstock brought about approximately a 50% reduction in catalyst activity for denitrogenation. It is therefore evident that the elimination of ammonia from the recycle gas in the high-pressure hydrofiner employed herein is an effective means of improving the efficiency of catalyst utilization and reducing reactor size. It is also apparent that about 5 volume-percent of hydrogen sulfide in the recycle gas appears to give optimum activity for denitrogenation (compare Runs 1 and 4).

*Example III*

This example demonstrates the deleterious effect of heavy organic nitrogen compounds on the denitrogenation rate for lighter organic nitrogen compounds.

A hydrofining run was carried out under conditions identical to those described in Example I, Run No. 1, except that 83 parts per million of nitrogen was added to the feed as carbazole. The resulting product was found to contain 58 p.p.m. of undecomposed carbazole nitrogen, and 81 p.p.m. of original feed nitrogen (basic nitrogen). Since under these same conditions in Run No. 1, the original feed nitrogen level was reduced to 54 p.p.m., it is apparent that the addition of carbazole reduced the relative denitrogenation activity of the catalyst to about 74% of the activity shown in Run No. 1.

It is evident, therefore, that the elimination of heavy organic nitrogen from the feedstocks employed herein in the low-pressure hydrofiner is an effective means of improving the efficiency of catalyst utilization.

Results substantially similar to those described in the above examples are obtained when other feedstocks and catalysts within the purview of this invention are substituted therein. It is not intended that the invention should be limited to the details described herein, since many variations may be made by those skilled in the art without departing from the scope or spirit of the following claims:

I claim:

1. A process for hydrocracking a heavy mineral oil feedstock, at least about 10% of which boils above 700° F., and which contains at least about 0.02 weight-percent of nitrogen, to produce therefrom hydrocarbons boiling in the gasoline range, which comprises:
   (1) fractionating said feedstock to recover a heavy gas oil boiling predominantly above 700° F., and a light gas oil boiling predominantly below 700° F.;
   (2) subjecting said light gas oil to catalytic hydrofining in the presence of added hydrogen and a hydrofining catalyst, and under hydrofining conditions including a hydrogen partial pressure between about 500 and 2,500 p.s.i.a.;
   (3) subjecting said heavy gas oil to separate catalytic hydrofining in the presence of added hydrogen and a hydrofining catalyst, and under hydrofining conditions including a hydrogen partial pressure which is (a) between about 1,000 and 5,000 p.s.i.a., and (b)

at least about 400 p.s.i.a. higher than the hydrogen partial pressure employed in step (2);

(4) cooling, condensing and water-washing the effluent from step (3) without substantial depressuring, and separating therefrom spent ammoniacal wash water, a high-pressure, substantially ammonia-free recycle gas, and a condensed liquid hydrocarbon product;

(5) recycling said high-pressure recycle gas to step (3);

(6) mixing total effluent from step (2), without substantial depressuring, cooling or treating for removal of ammonia, with said condensed liquid hydrocarbon product from step (4), and subjecting the resulting mixture to hydrocracking at elevated temperatures and at a pressure substantially the same as that employed in step (2) in the presence of a hydrocracking catalyst; and (7) fractionating the effluent from step (6) to recover therefrom a gasoline product, a higher boiling recycle oil which is recycled at least in part to said hydrocracking step (6), and a low-pressure recycle gas which is recycled at least in part to hydrofining step (2).

2. A process as defined in claim 1 wherein at least about 10% of said feedstock boils above 700° F., at least about 20% boils below 750° F., and wherein at least about 95% of the light gas oil separated in step (1) boils below 750° F., and at least about 80% of said heavy gas oil boils above 700° F.

3. A process as defined in claim 1 wherein said hydrofining catalysts comprise a Group VI–B metal oxide and/or sulfide plus a Group VIII metal oxide and/or sulfide supported on an adsorbent oxide carrier having a Cat-A cracking Activity Index below about 20.

4. A process as defined in claim 3 wherein said Group VI–B metal is molybdenum and said Group VIII metal is nickel.

5. A process as defined in claim 1 wherein said hydrocracking catalyst comprises a minor proportion of a Group VIII metal hydrogenation component deposited upon a molecular sieve cracking base wherein the zeolitic cations thereof are mainly hydrogen and/or polyvalent metal ions.

6. A process as defined in claim 5 wherein said Group VIII metal is a noble metal.

7. A process for hydrocracking a heavy mineral oil feedstock, at least about 10% of which boils above 700° F., and which contains at least about 0.02 weight-percent of nitrogen, to produce therefrom hydrocarbons boiling in the gasoline range, which comprises:

(1) fractionating said feedstock to recover a heavy gas oil boiling predominantly above 700° F., and a light gas oil boiling predominantly below 700° F.;

(2) subjecting said light gas oil to catalytic hydrofining in the presence of added hydrogen and a hydrofining catalyst, and under hydrofining conditions including a hydrogen partial pressure between about 500 and 2,500 p.s.i.a.;

(3) subjecting said heavy gas oil to separate catalytic hydrofining in the presence of added hydrogen and a hydrofining catalyst, and under hydrofining conditions including a hydrogen partial pressure which is (a) between about 1,000 and 5,000 p.s.i.a., and (b) at least about 400 p.s.i.a. higher than the hydrogen partial pressure employed in step (2);

(4) separating effluent from step (3) into a hot vapor phase and a hot liquid phase without substantial cooling or depressuring;

(5) cooling, condensing and water-washing said vapor phase without substantial depressuring, and separating therefrom spent ammoniacal wash water, a high-pressure, substantially ammonia-free recycle gas and a light hydrocarbon condensate;

(6) recycling said high-pressure recycle gas to step (3);

(7) mixing total effluent from step (2), without substantial cooling, depressuring or treatment for removal of ammonia, with said hot liquid phase from step (4), and subjecting the resulting mixture to hydrocracking at elevated temperatures and at a pressure substantially the same as that employed in step (2) in the presence of a hydrocracking catalyst; and (8) fractionating the effluent from step (7) to recover therefrom a gasoline product, a higher boiling recycle oil which is recycled at least in part to said hydrocracking step (7), and a low-pressure recycle gas which is recycled at least in part to hydrofining step (2).

8. A process as defined in claim 7 wherein said light hydrocarbon condensate from step (5) is also hydrocracked in step (7).

9. A process as defined in claim 7 wherein said light hydrocarbon condensate from step (5) is depressured and fractionated along with hydrocracking effluent in step (8) to recover gasoline, and wherein the high-boiling fraction therefrom is recycled to said hydrocracking step (7).

10. A process as defined in claim 7 wherein a portion of said light hydrocarbon condensate from step (5) is depressured to flash off dissolved light gases, and is then repressured and contacted with said high-pressure recycle gas to strip additional light hydrocarbon gases therefrom.

11. A process as defined in claim 7 wherein at least about 10% of said feedstock boils above 700° F., at least 20% boils below 750° F., and wherein at least about 95% of the light gas oil separated in step (1) boils below 750° F., and at least about 80% of said heavy gas oil boils above 700° F.

12. A process as defined in claim 7 wherein said hydrofining catalysts comprise a Group VI–B metal oxide and/or sulfide plus a Group VIII metal oxide and/or sulfide supported on an adsorbent oxide carrier having a Cat-A cracking Activity Index below about 20.

13. A process as defined in claim 7 wherein said hydrocracking catalyst comprises a minor proportion of a Group VIII metal hydrogenation component deposited upon a molecular sieve cracking base wherein the zeolitic cations thereof are mainly hydrogen and/or polyvalent metal ions.

References Cited

UNITED STATES PATENTS

| | | | |
|---|---|---|---|
| 2,938,857 | 5/1960 | Johnson et al. | 208—254 |
| 2,983,676 | 5/1961 | Howland | 208—254 |
| 3,268,438 | 8/1966 | Scott et al. | 208—89 |

SAMUEL P. JONES, *Primary Examiner.*

DELBERT E. GANTZ, *Examiner.*